US010699319B1

(12) United States Patent
Flowers et al.

(10) Patent No.: US 10,699,319 B1
(45) Date of Patent: Jun. 30, 2020

(54) CROSS SELLING RECOMMENDATION ENGINE

(71) Applicant: STATE FARM MUTUAL AUTOMOBILE INSURANCE COMPANY, Bloomington, IL (US)

(72) Inventors: Elizabeth Flowers, Bloomington, IL (US); Puneit Dua, Bloomington, IL (US); Eric Balota, Bloomington, IL (US); Shanna L. Phillips, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 260 days.

(21) Appl. No.: 15/495,693

(22) Filed: Apr. 24, 2017

Related U.S. Application Data

(60) Provisional application No. 62/368,548, filed on Jul. 29, 2016, provisional application No. 62/368,271, filed on Jul. 29, 2016, provisional application No. 62/368,298, filed on Jul. 29, 2016, provisional application No. 62/368,332, filed on Jul. 29, 2016, provisional application No. 62/368,359, filed on Jul. 29, 2016, provisional application No. 62/368,406, filed on Jul. 29, 2016, provisional application No. 62/368,448, filed on Jul. 29, 2016, provisional application No. 62/368,503, filed on Jul. 29, 2016, provisional application No. 62/368,512, filed on Jul. 29, 2016, provisional application No. 62/368,525, filed on Jul. 29, 2016, provisional application No. 62/368,536, filed on Jul. 29, 2016, provisional application No. 62/368,572, filed on Jul. 29, 2016, provisional application No. 62/368,588, filed on Jul. 29, 2016, provisional application No. 62/337,711, (Continued)

(51) Int. Cl.
*G06Q 30/00* (2012.01)
*G06Q 30/06* (2012.01)
*G06F 40/30* (2020.01)

(52) U.S. Cl.
CPC ........ *G06Q 30/0631* (2013.01); *G06F 40/30* (2020.01)

(58) Field of Classification Search
None
See application file for complete search history.

(56) References Cited

U.S. PATENT DOCUMENTS 6,658,393 B1  12/2003  Basch et al.
7,765,557 B2   7/2010  Young
(Continued)

OTHER PUBLICATIONS

U.S. Appl. No. 15/495,549, Heuristic Identity Authentication Engine, Flowers et al., filed Apr. 24, 2017.
(Continued)

*Primary Examiner* — Mila Airapetian
(74) *Attorney, Agent, or Firm* — Lee & Hayes, P.C.

(57) ABSTRACT

A heuristic cross-selling recommendation engine includes capabilities to collect an unstructured data set and a current business context to suggest marketing actions. By providing a heuristic algorithm and executing the algorithm within the engine with the data set allows determination of predicted future contexts and optimal marketing actions. Such heuristic algorithms may learn from past marketing transactions and appropriate correlations with events and available data.

20 Claims, 11 Drawing Sheets

Related U.S. Application Data filed on May 17, 2016, provisional application No. 62/335,374, filed on May 12, 2016.

(56) References Cited

U.S. PATENT DOCUMENTS

| | | | |
|---|---|---|---|
| 7,870,431 B2 | 1/2011 | Cirne et al. | |
| 8,117,097 B2 | 2/2012 | Abbott | |
| 8,135,633 B1 | 3/2012 | LeBaron et al. | |
| 8,271,396 B2 | 9/2012 | Ronning et al. | |
| 8,560,390 B2* | 10/2013 | Higgins | G06Q 30/02 705/14.2 |
| 8,615,520 B2 | 12/2013 | Fallah | |
| 8,688,579 B1 | 4/2014 | Ethington et al. | |
| 8,775,299 B2 | 7/2014 | Achanta et al. | |
| 8,811,711 B2 | 8/2014 | Calman et al. | |
| 8,826,155 B2 | 9/2014 | Dixon et al. | |
| 8,838,474 B2 | 9/2014 | Macy et al. | |
| 8,842,331 B1 | 9/2014 | Enge | |
| 8,885,963 B2 | 11/2014 | Coleman | |
| 8,996,411 B2 | 3/2015 | Thomas | |
| 9,117,117 B2 | 8/2015 | Macciola et al. | |
| 9,349,145 B2 | 5/2016 | Rozman et al. | |
| 9,473,634 B1 | 10/2016 | Ouimette et al. | |
| 9,942,250 B2 | 4/2018 | Stiansen et al. | |
| 2002/0194117 A1 | 12/2002 | Nabe et al. | |
| 2003/0074328 A1 | 4/2003 | Schiff et al. | |
| 2004/0036961 A1 | 2/2004 | McGuire | |
| 2004/0039691 A1 | 2/2004 | Barratt et al. | |
| 2005/0091524 A1 | 4/2005 | Abe et al. | |
| 2006/0212386 A1 | 9/2006 | Willey et al. | |
| 2006/0253578 A1 | 11/2006 | Dixon et al. | |
| 2007/0168285 A1 | 7/2007 | Girtakovskis et al. | |
| 2008/0255891 A1 | 10/2008 | Stone | |
| 2009/0049550 A1 | 2/2009 | Shevchenko | |
| 2010/0222053 A1 | 9/2010 | GiriSrinivasaRao et al. | |
| 2010/0332287 A1 | 12/2010 | Gates et al. | |
| 2011/0047071 A1 | 2/2011 | Choudhuri et al. | |
| 2011/0071857 A1 | 3/2011 | Malov et al. | |
| 2011/0178901 A1 | 7/2011 | Imrey et al. | |
| 2011/0225138 A1 | 9/2011 | Johnston | |
| 2011/0262536 A1 | 10/2011 | Jordan et al. | |
| 2011/0295722 A1* | 12/2011 | Reisman | G06Q 30/0201 705/27.1 |
| 2011/0306028 A1 | 12/2011 | Galimore | |
| 2011/0307258 A1 | 12/2011 | Liberman et al. | |
| 2012/0116972 A1 | 5/2012 | Walker | |
| 2012/0158541 A1 | 6/2012 | Ganti et al. | |
| 2012/0158574 A1 | 6/2012 | Brunzell et al. | |
| 2012/0259722 A1* | 10/2012 | Mikurak | G06Q 10/087 705/26.1 |
| 2012/0262461 A1 | 10/2012 | Fisher et al. | |
| 2013/0018796 A1 | 1/2013 | Kolhatkar et al. | |
| 2014/0006166 A1 | 1/2014 | Chiang et al. | |
| 2014/0081832 A1 | 3/2014 | Merrill et al. | |
| 2014/0222631 A1 | 8/2014 | Love et al. | |
| 2014/0236829 A1 | 8/2014 | Ganti | |
| 2014/0270145 A1 | 9/2014 | Erhart et al. | |
| 2014/0278839 A1 | 9/2014 | Lynam et al. | |
| 2014/0324564 A1 | 10/2014 | Walker et al. | |
| 2014/0337083 A1 | 11/2014 | Goyal et al. | |
| 2015/0117747 A1 | 4/2015 | Smith et al. | |
| 2015/0142595 A1 | 5/2015 | Acuna-Rohter | |
| 2015/0142713 A1 | 5/2015 | Gopinathan et al. | |
| 2015/0201077 A1 | 7/2015 | Konig et al. | |
| 2015/0235240 A1* | 8/2015 | Chang | G06Q 30/0202 705/7.31 |
| 2015/0254719 A1 | 9/2015 | Barfield, Jr. et al. | |
| 2015/0278944 A1 | 10/2015 | Searson et al. | |
| 2015/0287026 A1 | 10/2015 | Yang et al. | |
| 2016/0042359 A1 | 2/2016 | Singh | |
| 2016/0044054 A1 | 2/2016 | Stiansen et al. | |
| 2016/0180726 A1 | 6/2016 | Ahuja et al. | |
| 2016/0225076 A1 | 8/2016 | Merrill et al. | |
| 2016/0373891 A1* | 12/2016 | Ramer | H04W 4/02 |
| 2017/0041464 A1 | 2/2017 | Sharma | |

OTHER PUBLICATIONS

U.S. Appl. No. 15/495,579, "Heuristic Context Prediction Engine", Flowers et al., filed Apr. 24, 2017.
U.S. Appl. No. 15/495,594, "Natural Language Virtual Assistant", Flowers et al., filed Apr. 24, 2017.
U.S. Appl. No. 15/495,603, "Heuristic Money Laundering Detection Engine", Flowers et al., Apr. 24, 2017.
U.S. Appl. No. 15/495,621, "Heuristic Credit Risk Assessment Engine", Flowers et al., Apr. 24, 2017.
U.S. Appl. No. 15/495,648, "Heuristic Document Verification and Real Time Deposit Engine", Flowers et al., filed Apr. 24, 2017.
U.S. Appl. No. 15/495,659, "Heuristic Account Fraud Detection Engine", Flowers et al., filed Apr. 24, 2017.
U.S. Appl. No. 15/495,678, "Natural Language Troubleshooting Engine", Flowers et al., filed Apr. 24, 2017.
U.S. Appl. No. 15/495,699, "Book of Business Impact Assessment Engine", Flowers et al., filed Apr. 24, 2017.
U.S. Appl. No. 15/495,716, "Process Re-Design Targeting Engine", Flowers et al., Filed Apr. 24, 2017.
U.S. Appl. No. 15/495,724, "Financial Literacy Mentoring Assistant Engine", Flowers et al., filed Apr. 24, 2017.
U.S. Appl. No. 15/495,743, "Heuristic Sales Agent Training Assistant", Flowers et al., filed Apr. 24, 2017.
Office Action for U.S. Appl. No 15/495,603, dated Dec. 9, 2019, Flowers,"Heuristic Money Laundering Detection Engine", 20 Pages.
Bishop, "Pattern Recognition and Machine Learning", Springer Science, 2006, 758 pages.
Jaroslav, et. al., "Internal Model of Commercial Bank as an Instrument for Measuring Credit Risk of the Borrower in Relation to Financial Performance (Credit Scoring and Bankruptcy Models)", Journal of Competitiveness, Iss. 4, 2011, pp. 104-120.
Final Office Action dated Jan. 22, 2020 for U.S. Appl. No. 15/495,743 "Heuristic Sales Agent Training Assistant" Flowers, 9 pages.
Final Office Action dated Jan. 7, 2020 for U.S. Appl. No. 15/495,699 "Book of Business Impact Assessment Engine" Flowers, 26 pages.

* cited by examiner

CROSS SELLING RECOMMENDATION ENGINE

CROSS-REFERENCE TO RELATED APPLICATIONS

This application claims the benefit of U.S. Provisional Patent Application Nos. 62/337,711 and 62/335,374, filed respectively on May 12, 2016 and May 17, 2016, and U.S. Provisional Application Nos. 62/368,448, 62/368,406, 62/368,359, 62/368,588, 62/368,572, 62/368,548, 62/368,536, 62/368,525, 62/368,512, 62/368,503, 62/368,332, 62/368,298, 62/368,271, filed on Jul. 29, 2016, the disclosures of which are hereby incorporated herein by reference.

FIELD OF THE INVENTION

The disclosure generally relates to systems, methods, apparatus, and non-transitory computer readable media for using heuristic algorithms to generate cross selling recommendations and, more particularly, to process natural language inputs and unstructured data sets to predict a best next marketing action.

BACKGROUND

Organizations involved in customer service activities often process large amounts of unstructured data to make decisions while interacting with a customer in real-time. For example, in the case of a customer service representative speaking on the telephone with a customer experiencing an issue with a product or service, appropriate solutions may include a combination of timeliness of response and accuracy in content.

Such unstructured data may include voluminous transaction records spanning decades, unstructured customer service data, or real-time transcripts of customer service interactions with scattered contextual indicators. To reasonably expect a customer service representative to effectively leverage such large data sets in real-time places an unreasonable burden on a customer service representative. However, failing to do so robs the customer service representative of vital context not readily apparent, and the wealth of knowledge gained throughout the history of an organization that would otherwise need to be distilled to briefing materials and expensively trained over time. Thus, organizations may value tools to rapidly process large data sets, to infer context, suggest lessons learned based upon transaction data, while learning through successive process iterations. Furthermore, appropriate application of such tools may provide a competitive advantage in a crowded and competitive customer service industry.

In an effort to automate and provide better predictability of customer service experiences, many organizations develop customer relationship management (CRM) software packages. Organizations that develop these software packages often develop custom solutions, at great expense, to best meet the needs of their customers in unique industries. Such tools while providing a great level of detail for the customer service representative, lack the flexibility to react to changing business conditions or fully exploit the underlying technology, driving additional cost into an already expensive solution.

Some organizations where able to make concessions on customized solutions turn to off-the-shelf or commercially available software solutions that reduce the overall cost of implementation. Such solutions may provide customer service representative prompting tools with question and answer formats that allow for consistency of customer experience, however, at the expense of a less personalized experience required in many industries. While more flexible than fully-custom solutions, the impersonal question-answer format of customer interaction may not improve without costly software revisions, rarely performed by original equipment manufacturers (OEMs) of off-the-shelf solutions.

The ability for a customer service experience to learn and improve over successive iterations remains paramount for organizations to offer discriminating customer service experiences. Often the burden of continual improvement falls to the customer service representative, as a human being able to adapt and learn to changing conditions more rapidly even within the confines of a rigid customer service software application. However, with the advent of outsourcing prevalent in the customer service industry, the customer service representative may lack much of the necessary context required to provide high levels of relevant customer service. This lack of context in an interconnected company is less an issue of distance and more an issue of data access and the ability to contextually process data to present relevant solutions in a timely manner.

SUMMARY

One exemplary embodiment includes a computer-implemented method, executed with a computer processor, that generates a credit score. This method may include retrieving an un-structured data set including an aggregated transaction set that includes a plurality of users and at least one correlation of a user to a credit score. This method may include receiving a plurality of financial transactions, accessing and executing a heuristic algorithm to generate a credit score using the aggregated transaction set, the correlation, and/or the plurality of financial transactions. The method may include additional, less, or alternate actions, including those discussed elsewhere herein.

Yet another alternative embodiment includes a computer-implemented method, executed with a computer processor, that generates cross-selling recommendations using an aggregated customer transaction list. The method may include retrieving an aggregated transaction list from a plurality of customers and receiving a natural language input in a customer service environment. The method may also include accessing and executing a heuristic algorithm to generate at least one product recommendation using the language input and the transaction list. A product category of the recommendation, for example, may correlate with a predicted need. The method may include receiving an indication of interest in the recommendation and/or updating the algorithm using a calculated correlation between the recommendation and the indication. The method may include additional, less, or alternate actions, including those discussed elsewhere herein.

Still another embodiment includes a computer-implemented method, executed with a computer processor, that predicts an impact on a book of business by a change in an offered credit interest rate. The method may include retrieving an aggregated behavior list from a plurality of customers including offered credit interest rate data, and/or receiving the offered credit interest rate. The method may also include accessing and executing a heuristic algorithm to generate a predicted impact on a book of business, including the number of customers using the offered credit interest rate and the behavior list. Further, the method may include receiving an actual behavior with a human machine interface and/or updating the algorithm using a calculated correlation between the offered rate and the behavior. The method may include additional, less, or alternate actions, including those discussed elsewhere herein.

In yet another embodiment, a computer-implemented method, executed in a computer processor, includes targeting a portion of a business process for modification. The method may include retrieving an un-structured transaction set from a plurality of customers including a time associated with a plurality of portions of the business process. Furthermore, the process may include accessing and executing a heuristic algorithm to generate an indication associated with the portion of the business process that exceeds a threshold required for modification, using the un-structured transaction set. Still further, the method may include receiving a quantified impact on the portion of the business process and/or updating the algorithm using the quantified impact. The method may include additional, less, or alternate actions, including those discussed elsewhere herein.

An exemplary embodiment includes a computer-implemented method, executed with a computer processor, that generates a financial literacy suggestion using a transaction history. The method may include retrieving an un-structured transaction set, associated with a customer, accessing and executing a heuristic algorithm to generate the financial literacy suggestion using the transaction history. Furthermore, the method may include receiving an indication of relevance from the customer and updating, the algorithm using a calculated correlation between the suggestion and the relevance. The method may include additional, less, or alternate actions, including those discussed elsewhere herein.

Exemplary embodiments may include computer-implemented methods that may in other embodiments include apparatus configured to implement the method, and/or non-transitory computer readable mediums comprising computer-executable instructions that cause a processor to perform the method.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Various embodiments of the present disclosure include the collection of unstructured data sets together with a current context. Heuristic algorithms processing these unstructured data sets together the context may allow calculation of a future context, and the presentation of context relevant data that improves over time. By subsequently training the heuristic algorithm with the outcome of a current and future predicted context, and the relevance of presented data, the heuristic algorithm may improve its efficiency as the unstructured data set grows.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Credit Risk Assessment

Figure 1:
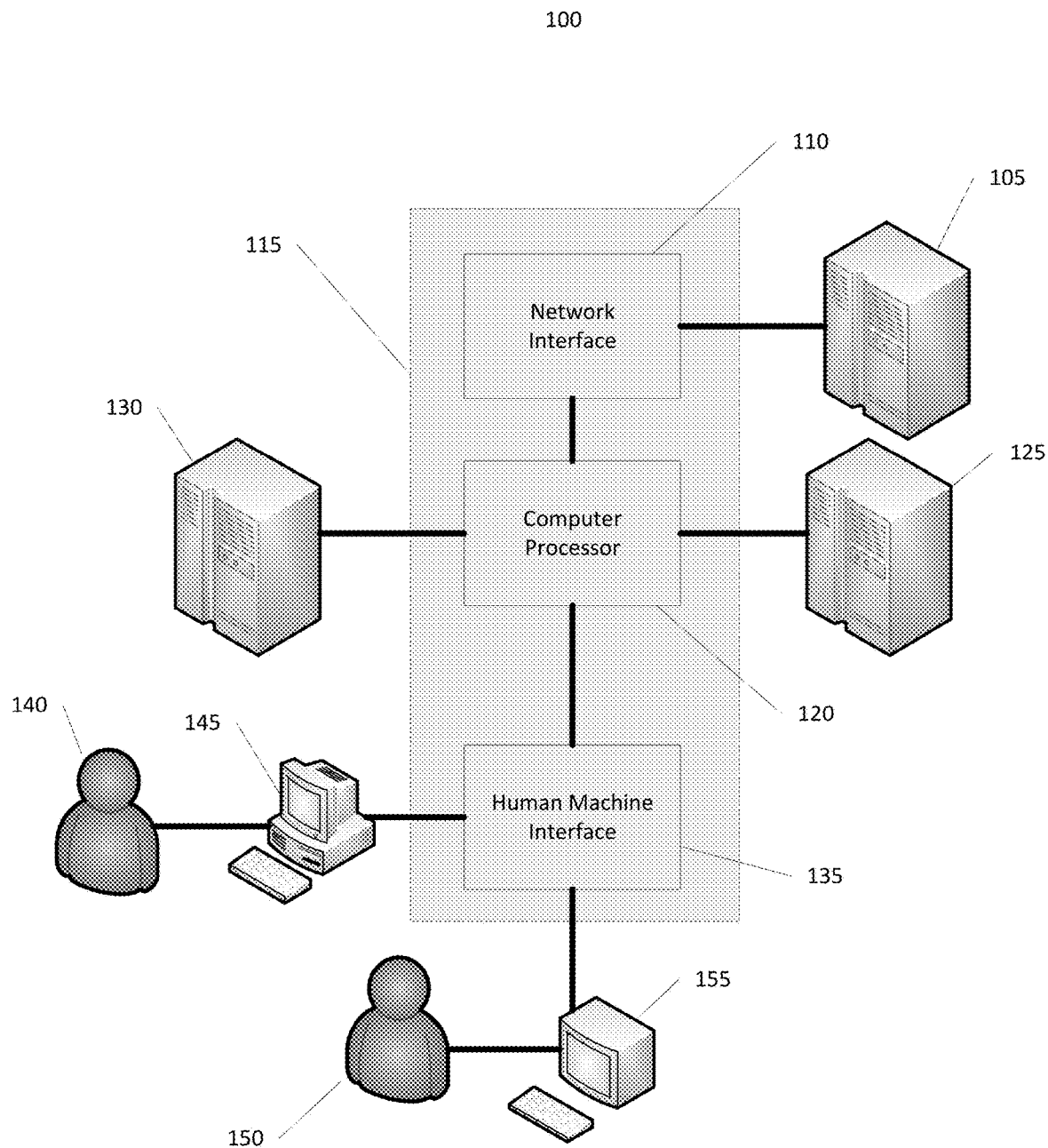
FIG. 1 illustrates an exemplary computer system to assess credit in accordance with one aspect of the present disclosure.
Figure 2:
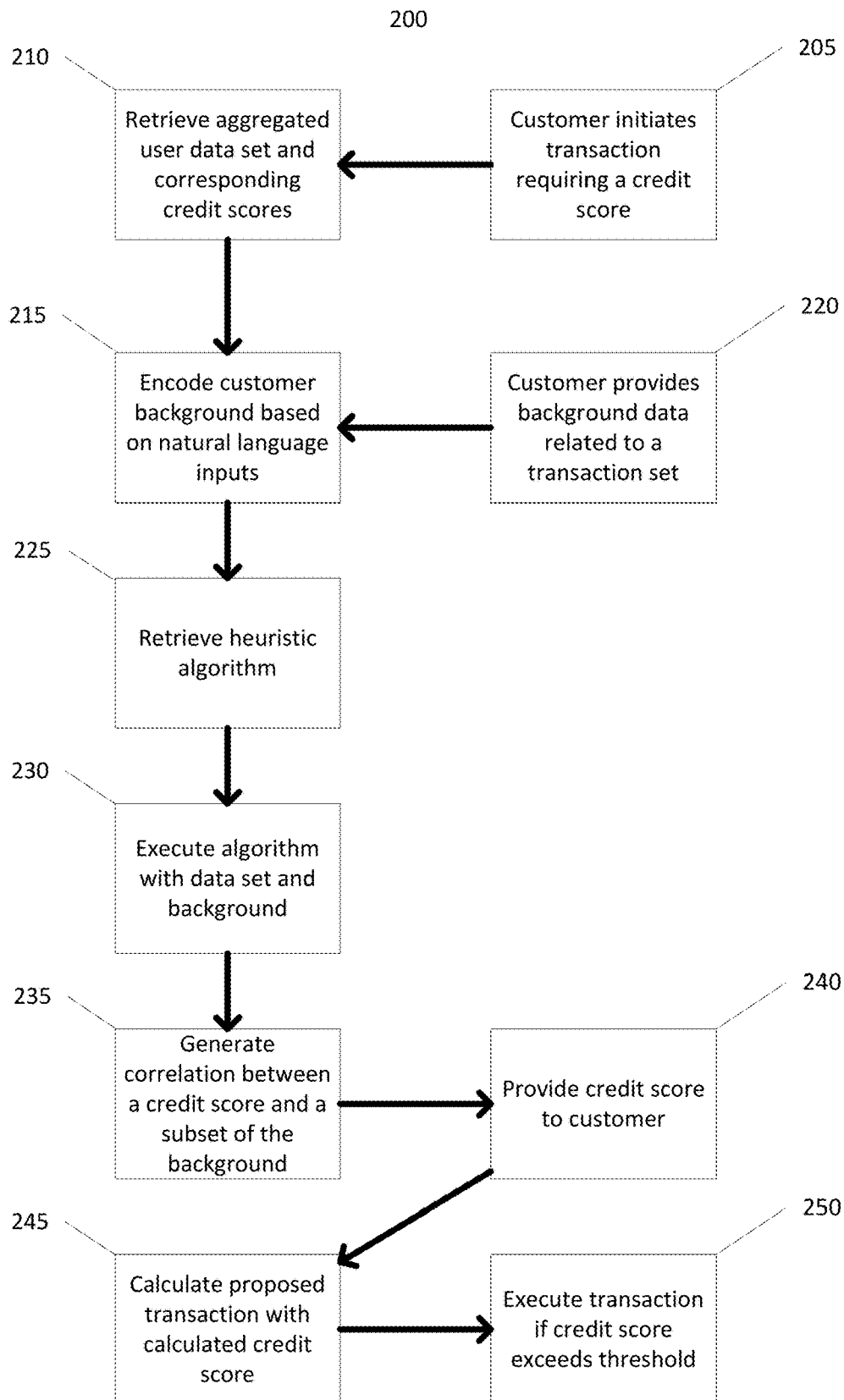
FIG. 2 illustrates an exemplary computer-implemented method to assess credit in accordance with one aspect of the present disclosure.

FIG. 1 illustrates a block diagram of an exemplary computer system 100 to determine a credit risk assessment. The exemplary system 100 enables a customer 150 to interface with a terminal 155 to perform a transaction and allows a customer service representative 140, using a service terminal 145, to assess a credit risk associated with a transaction. The customer 150 and service representative 140 may communicate through a human-machine interface 135, that together with a processor 120, and network interface 110, comprise a heuristic engine 115. In other embodiments, the heuristic engine 115 may include a variety of memory devices, interface devices, and processing devices, to execute required functions. In one embodiment, the processor 120 may interface to a heuristic server 125, a transaction server 130, and a remote server 105.

Figure 10:
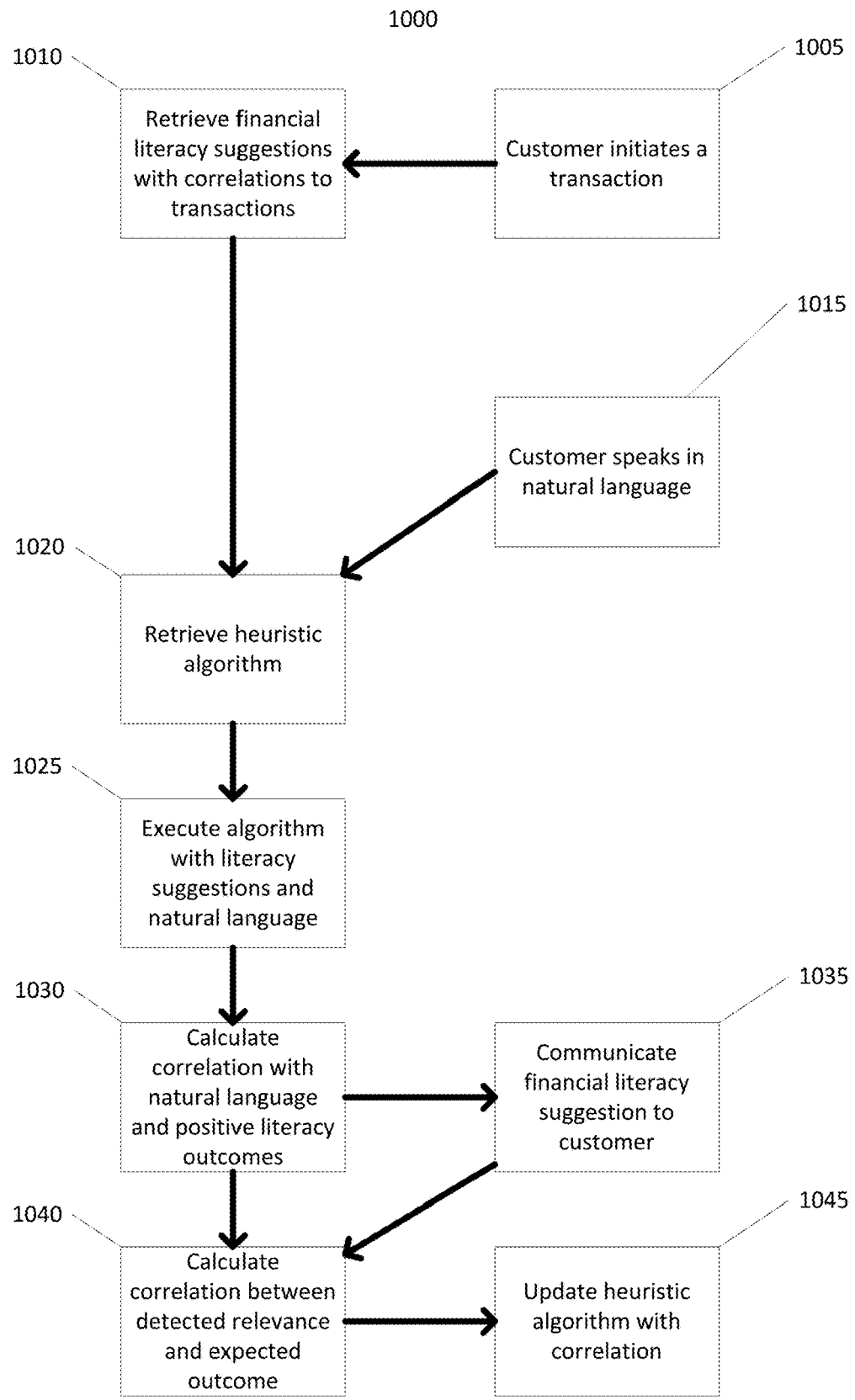
FIG. 10 illustrates an exemplary computer-implemented method to generate financial literacy recommendations in accordance with one aspect of the present disclosure.

In accordance with one aspect of the present disclosure, the system 100 may perform the computer-implemented method 1000, as illustrated in FIG. 10. However, in one embodiment, the method 1000 does not, or may not, specifically require the system 100, nor do the elements included therein require a particular arrangement, to perform the method steps illustrated in the process 1000.

Method 200 may include a customer, such as the customer 150 from FIG. 1, that initiates a transaction requiring a credit score, or credit risk assessment (block 205). In one embodiment, the processor 120 may retrieve an aggregated user data set and corresponding credit scores, for example from the remote server 105, or the transaction server 130 (block 210). In one embodiment (block 220), a customer may provide background data related to a transaction set. For example, the processor 120 may encode a customer background based upon, in one embodiment, natural language inputs (block 215), for example the background data related to the transaction set, or otherwise. In one embodiment (block 225), the processor 120 may retrieve a heuristic algorithm from the heuristic server 125.

The processor 120 may execute the algorithm with the data set (block 230) and the background data. In one exemplary embodiment the processor may generate a correlation between a credit score and a subset of the background data (block 235). The service representative 140 may provide a credit score to the user, using the service terminal 145 and the user terminal 155 (block 240). In one embodiment (block 245), the processor 120 may calculate the proposed transaction with the calculated credit score, and (block 250) execute the transaction if the credit score exceeds a predetermined threshold.

Cross-Selling Recommendation

Figure 3:
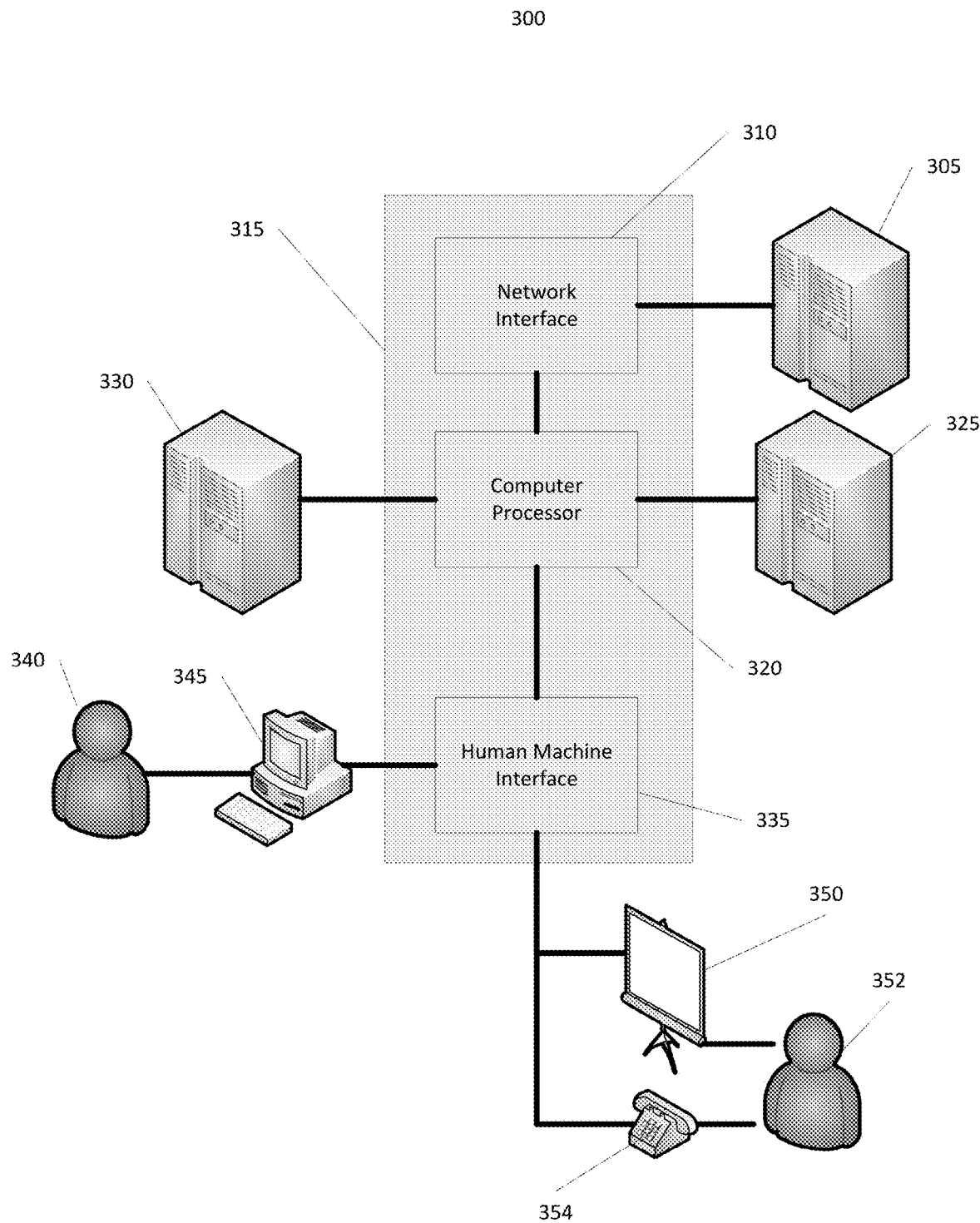
FIG. 3 illustrates an exemplary computer system to enable cross-selling in accordance with one aspect of the present disclosure.

FIG. 3 illustrates a block diagram of an exemplary computer system 300 to generate cross selling recommendations based upon a transaction set. The exemplary system 300 enables a user 340, using a computer terminal 345, to perform a transaction, and receive a recommendation. The terminal 345 may communicatively couple through a human-machine interface 335 to a projector screen 350 and telephone 354 interfacing with a customer service representative 352. The human-machine interface 335 interfaces to a computer processor 320 that likewise interfaces to a heuristic server 325, a transaction server 330, and a network interface 310. The human-machine interface 335, processor 320, and network interface 310 together comprise, in one embodiment, a heuristic engine 315. In other embodiments, the heuristic engine 315 may include a variety of memory devices, interface devices, and processing devices, to execute required functions. In one embodiment, the network interface 310 may communicatively couple to a remote server 305.

Figure 4:
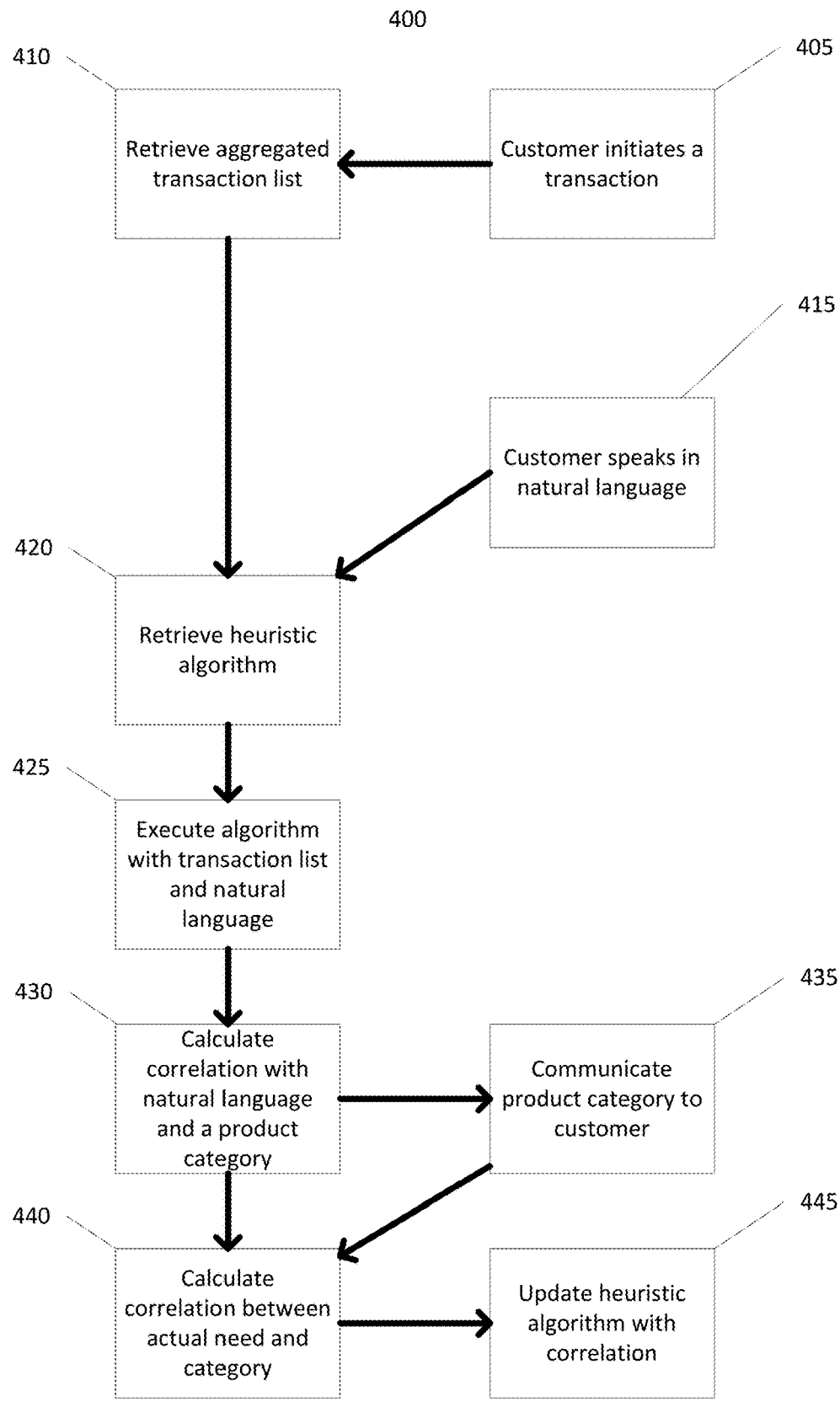
FIG. 4 illustrates an exemplary computer-implemented method to enable cross-selling in accordance with one aspect of the present disclosure.

In accordance with one aspect of the present disclosure, the system 300 may perform the computer-implemented method 400, as illustrated in FIG. 4. However, in one embodiment, the method 400 does not, or may not, specifically require the system 300, nor do the elements included therein require a particular arrangement, to perform the method steps illustrated in the process 400.

The method 400, in one embodiment, includes a user, such as the customer 340 of FIG. 3, that initiates a transaction (block 405). The processor 320 may retrieve (block 410) an aggregated transaction list from, for example, the remote server 305, or the transaction server 330. In one embodiment, (block 415), the user or customer may speak in natural language, in a manner wherein the terminal 345 encodes the language. The processor 320 may retrieve a heuristic algorithm, for example from the heuristic server 325 (block 420).

In one embodiment, the processor 320 may execute the algorithm with the transaction list and the natural language input. The processor 320 may calculate a correlation with the natural language and a product category (block 430). According to one embodiment, the service representative 352 may communicate the product category to the customer 340. The processor 320 may calculate a correlation between an actual need and the category (block 440). In one embodiment, the processor 320 may update the heuristic algorithm with the calculated correlation.

Business Portfolio Impact Calculation

Figure 5:
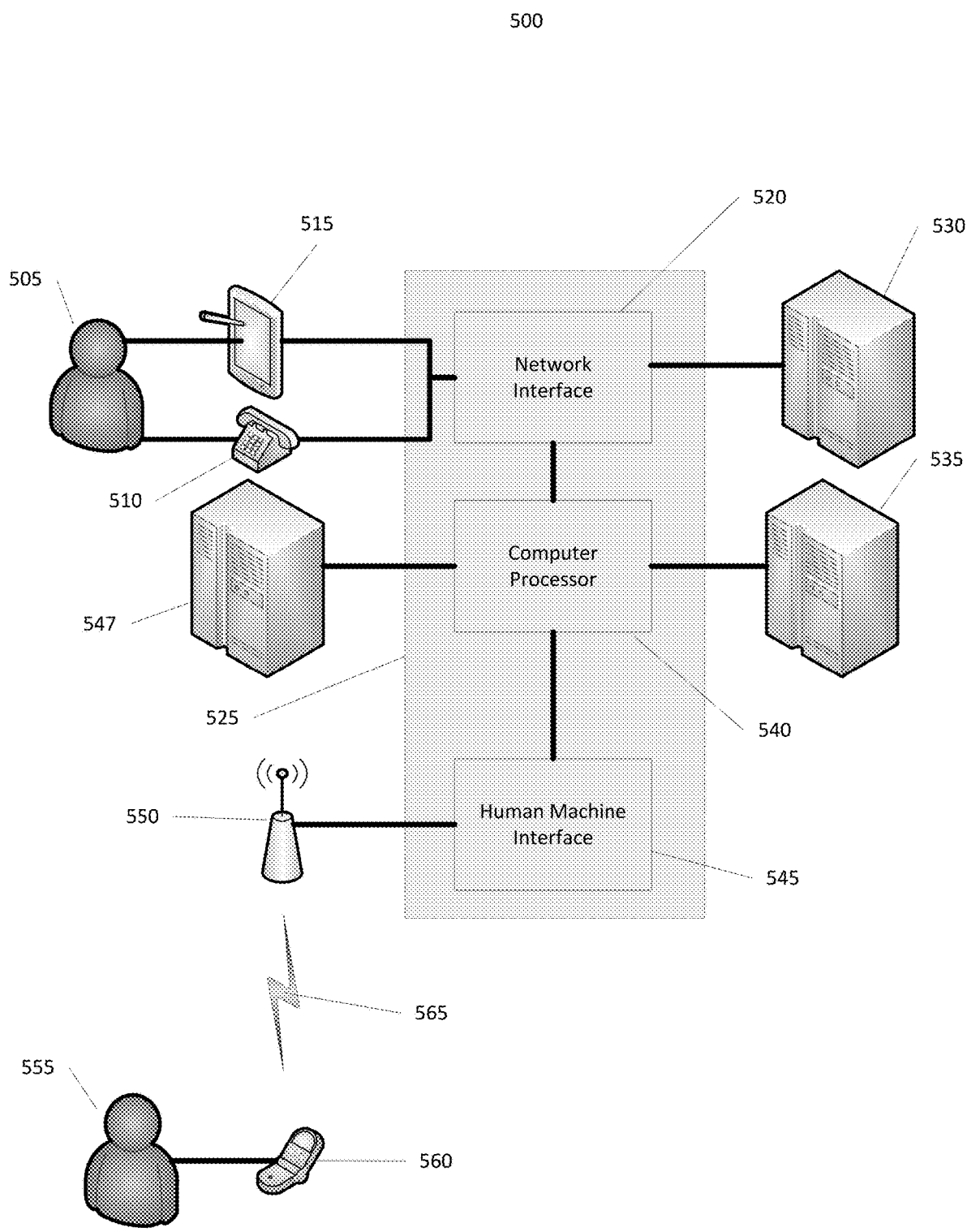
FIG. 5 illustrates an exemplary computer system to assess impact to a book of business in accordance with one aspect of the present disclosure.

FIG. 5 illustrates a block diagram of an exemplary computer system 500 to indicate an impact on a book of business based upon a change in an offered credit interest rate. The exemplary system 500 enables a user 555 to interface, for example, with a cellular telephone 560, to initiate a transaction that may result in an interest rate change to an existing or future product. The cellular telephone 560 may communicate over a wireless protocol 565 through a wireless access point 550 that communicatively couples to a human-machine interface 545. A customer service representative 505 may, in one embodiment, interface with a tablet computer 515 and a telephone 510, communicatively coupled to a network interface 520. The network interface 520 may interface to a remote server 530, and a computer processor 540. The computer processor 540 may interface to a heuristic server 535, a transaction server 547, and the human-machine interface 545.

Figure 6:
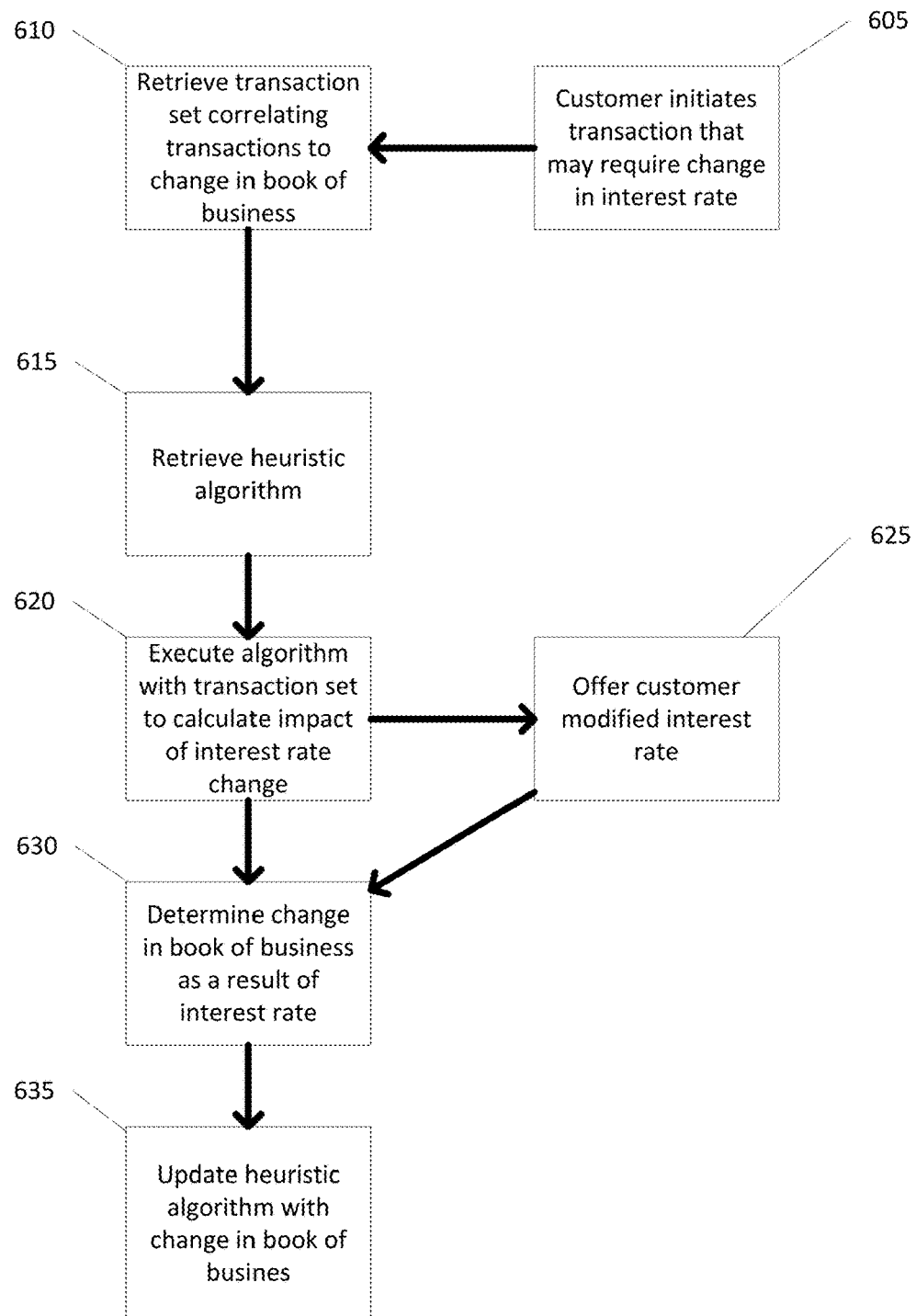
FIG. 6 illustrates an exemplary computer-implemented method to assess impact to a book of business in accordance with one aspect of the present disclosure.

In accordance with one aspect of the present disclosure, the system 500 may perform the computer-implemented method 600, as illustrated in FIG. 6. However, in one embodiment, the method 600 does not, or may not, specifically require the system 500, nor do the elements included therein require a particular arrangement, to perform the method steps illustrated in the process 600.

The method 600 includes, in one embodiment, a user, for example the user 555 of FIG. 5, that initiates a transaction that may require a change to an interest rate on a current or future product (block 605). The processor 540 may retrieve a transaction set correlating transactions to a change in a book of business, for example from the remote server 530 or the transaction server 547 (block 610). In one embodiment, the processor 540 may retrieve a heuristic algorithm from the heuristic server 535. The processor may execute the algorithm with the transaction set to calculate an impact of the interest rate change (block 620). In one exemplary embodiment, the service representative 505 communicates an offer of modified interest rate to the customer 555 (block 625). The processor 540 determines a change in a book of business as a result of a change in the modified interest rate (block 630). In one embodiment, the processor 540 updates the heuristic algorithm, for example in the heuristic server 535, using the change in the book of business.

Business Process Assessment and Modification

Figure 7:
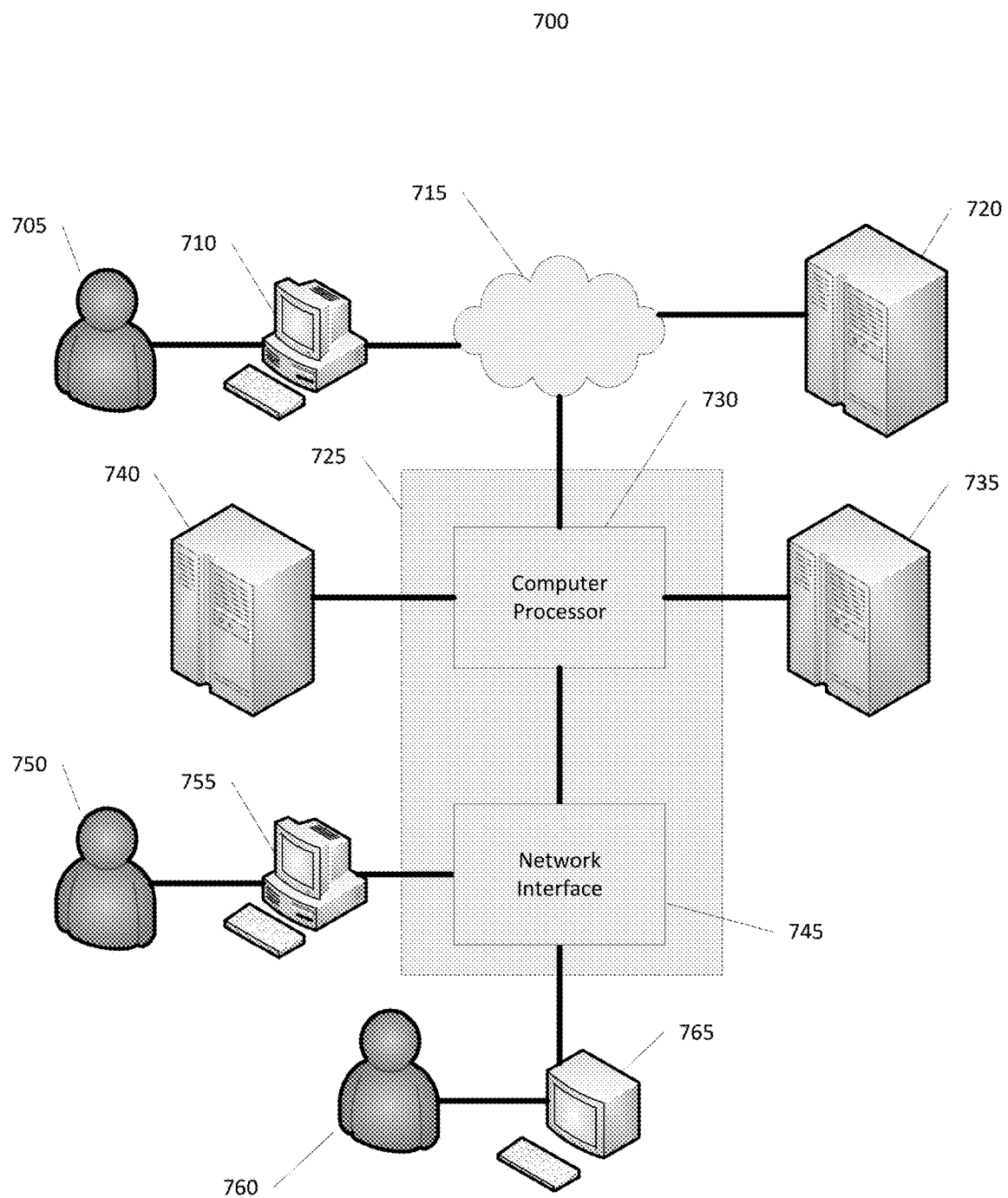
FIG. 7 illustrates an exemplary computer system to assess a business process impact in accordance with one aspect of the present disclosure.

FIG. 7 illustrates a block diagram of an exemplary computer system 700 to determine candidate portions of a business process for re-design using aggregate transaction data. The exemplary system 700 enables a user 760 to interface with a user terminal 765 to, for example, execute a business process. The user terminal 765, and a local service terminal 755 servicing a local service representative 750, may in one embodiment, communicatively couple to a network interface 745. The network interface 745, a heuristic server 735, and a transaction server 740 may each communicatively couple to a computer processor 730. In one embodiment, the computer processor 730 and the network interface 745 together comprise a heuristic engine 725. In other embodiments, the heuristic engine 725 may include a variety of memory devices, interface devices, and processing devices, to execute required functions. A computer network 715 may interconnect a remote server 720, a remote service terminal 710 servicing a remote customer service representative, and the computer processor 730.

Figure 8:
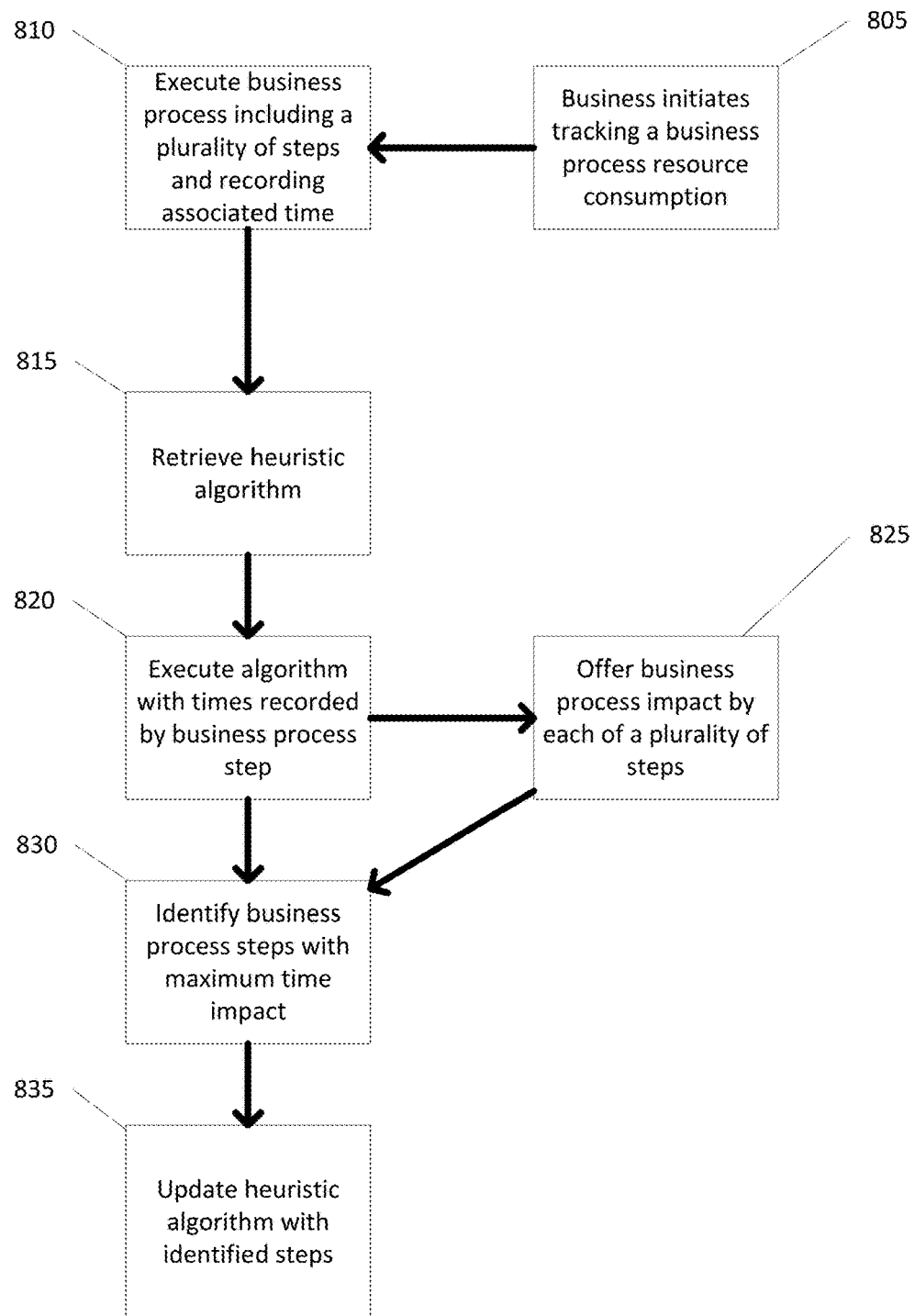
FIG. 8 illustrates an exemplary computer-implemented method to assess a business process impact in accordance with one aspect of the present disclosure.

In accordance with one aspect of the present disclosure, the system 700 may perform the computer-implemented method 800, as illustrated in FIG. 8. However, in one embodiment, the method 800 does not, or may not, specifically require the system 700, nor do the elements included therein require a particular arrangement, to perform the method steps illustrated in the process 800.

Process 800 includes, in one embodiment, a user, such as the user 760 of FIG. 7, that initiates a business process transaction (block 805), as part of an existing business. The processor 730 may execute the business process (block 810) including a plurality of steps and record the time associate with at least one of the steps, storing the data, for example in the remote server 720 or the transaction server 740. However, in some embodiments, the transaction data may reside within the processor for an indeterminate time. The processor 730 may retrieve a heuristic algorithm from the heuristic server 735 (block 815). In one embodiment the processor 730 may execute the algorithm with the times recorded by at least one business process step. In an alternative embodiment (block 825) at least one of the local representative 750 or the remote representative 705 may offer a business process modification to the user 760.

The processor 730 may identify business process steps with maximum time impact to the overall business process (block 830). In one embodiment, (block 835) the processor may update the heuristic algorithm in the heuristic server 735 with modification data on the identified steps.

Financial Literacy Training

Figure 9:
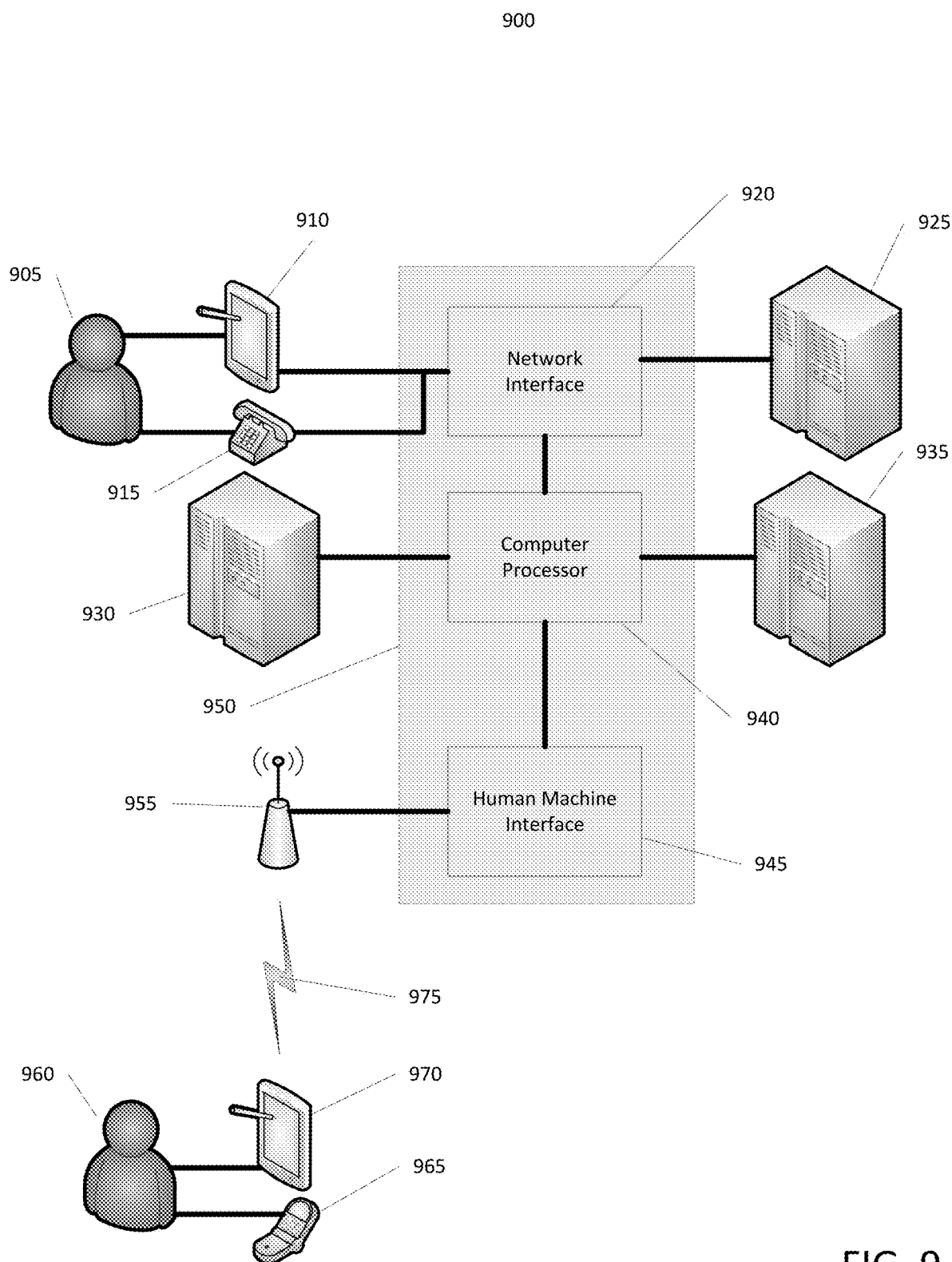
FIG. 9 illustrates an exemplary computer system to generate financial literacy recommendations in accordance with one aspect of the present disclosure.

FIG. 9 illustrates a block diagram of an exemplary computer system 900 to provide targeted financial literacy recommendations to a customer based upon a transaction history. The exemplary system 900 enables a user 960 to interface with a customer tablet computer 970 and/or a cellular telephone 965 to initiate and perform a financial transaction. The tablet 970 and/or cellular telephone 965 may communicate over a wireless protocol 975 to a wireless access point 955 that communicatively couples to a human-machine interface 945. A customer service representative 905 may, in another embodiment, interface with a service tablet computer 910 and a telephone 915. The tablet 910, telephone 915, and a remote server 925 each interface to a network interface 920. The network interface 920, a heuristic server 935, a transaction server 930, and the human-machine interface 945 each interface to a computer processor 940.

In one exemplary embodiment, a heuristic engine 950 comprises the network interface 920, the computer processor 940, and the human-machine interface 945. In other embodiments, the heuristic engine 935 may include a variety of memory devices, interface devices, and processing devices, to execute required functions.

In accordance with one aspect of the present disclosure, the system 900 may perform the computer-implemented method 1000, as illustrated in FIG. 10. However, in one embodiment, the method 1000 does not, or may not, specifically require the system 900, nor do the elements included therein require a particular arrangement, to perform the method steps illustrated in the process 1000.

The method 1000 includes a user, for example the user 960 of FIG. 9 in one embodiment, that initiates a transaction (block 1005). The processor 940 may retrieve financial literacy suggestions with correlations to transactions (block 1010). In one embodiment, a user 960 may speak in a natural language (block 1015), for example using the cellular telephone 960. The processor 940 may retrieve a heuristic algorithm from the heuristic server 935 (block 1020). In accordance with one embodiment, the processor 940 may execute the algorithm with the literacy suggestions and the natural language data.

The processor 940 may calculate correlation data with the natural language and positive financial literacy outcomes (block 1030), and the representative 905 may communicate the financial literacy suggestion to the user 960 (block 1035). In one embodiment, the processor may calculate a correlation (block 1040) between the detected relevance of the suggestion (block 1035) and an expected financial outcome. The processor 940 may update the heuristic algorithm (block 1045), for example in the heuristic server 935, with the correlation data.

Figure 11:
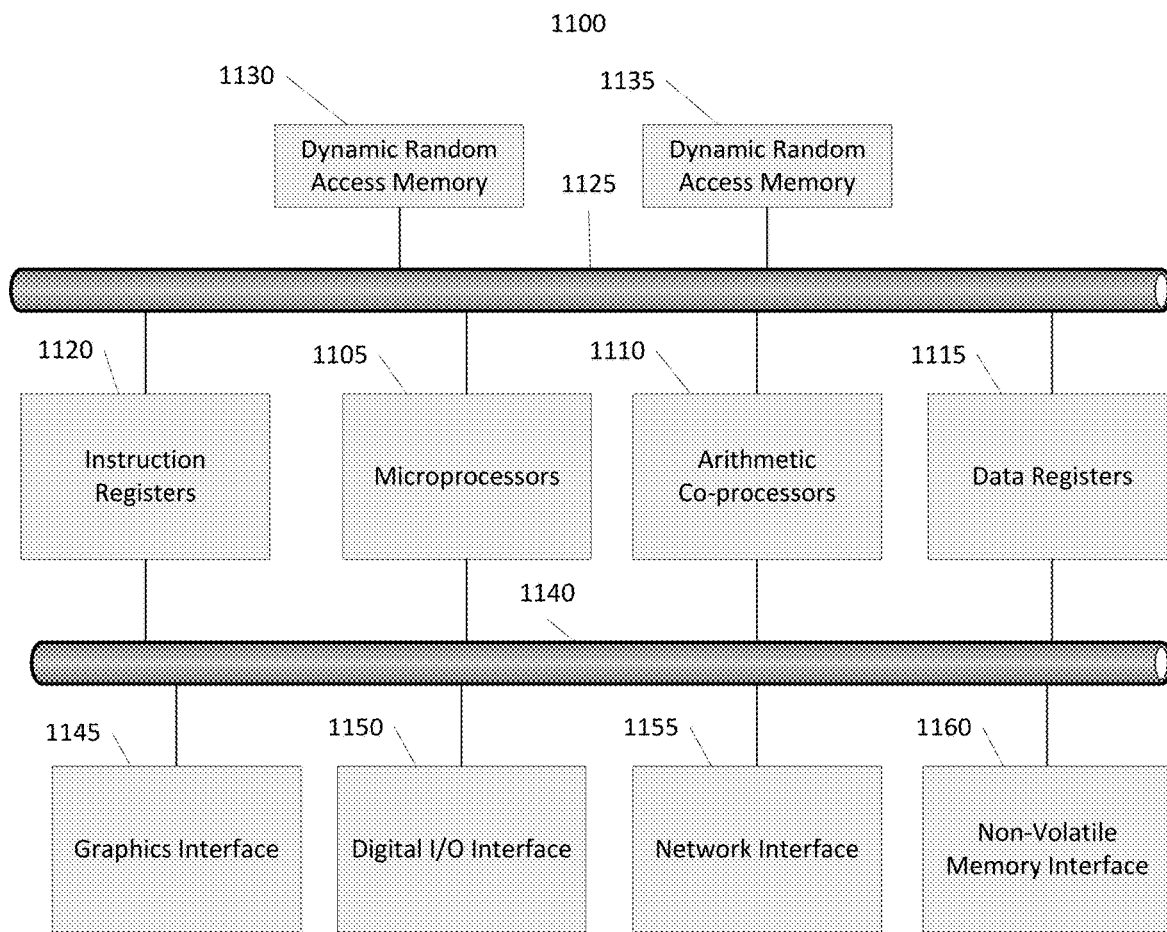
FIG. 11 illustrates an exemplary computing system to in accordance with one aspect of the present disclosure.

FIG. 11 illustrates an exemplary computing system 1100 in accordance with the embodiments disclosed in FIGS. 1-26 and 28. The exemplary computing system 1100 and components disclosed therein may comprise part, all, or none of the disclosed embodiments of FIGS. 1-10 and 12. The system 1100 includes one or more microprocessors 1105, coupled to supporting devices through multi-access busses 1125 and 1140. Dynamic random access memory 1130 and 1135 may interface to data bus 1125, and store data used by the one or more microprocessors 1105. The system 1100 includes instruction registers 1120 that store executable instructions for the one or more microprocessors 1105, and data registers 1115 that store data for execution. In some embodiments, the system 1100 includes one or more arithmetic co-processors 1110, to assist or supplement the one or more microprocessors 1105.

Data bus 1140 includes interfaces to a graphics interface 1145 that may in some embodiments process and transmit graphical data for a user on a display or similar devices. Likewise, data bus 1140 includes interfaces for a digital I/O interface that processes and transmits, for example, keyboard, pointing device, and other digital and analog signals produced and consumed by users or other machines. A network interface 1155 processes and transmits encoded information over wired and wireless networks to connect the system 1100 to other machines and users. Data bus 1140 also includes at least one interface to a non-volatile memory interface, that may process and transmit data that resides on non-volatile memory devices.

Figure 12:
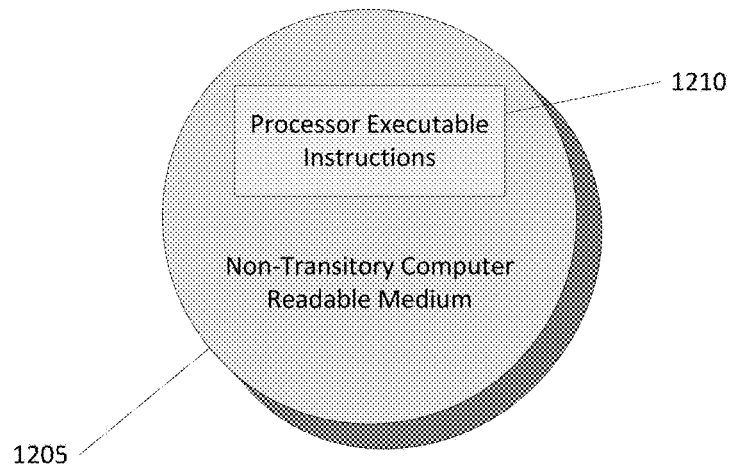
FIG. 12 illustrates an exemplary article of manufacture in accordance with one aspect of the present disclosure.

FIG. 12 illustrates a non-transitory computer readable medium 1205, that comprises processor executable instructions 1210. Such processor executable instructions may include instructions executed by the one or more processors 1105 of FIG. 11.

Machine Learning and Other Matters

In certain embodiments, the heuristic engine and algorithms discussed herein may include machine learning, cognitive learning, deep learning, combined learning, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more tokenized icons from user device details, user request or login details, user device sensors, geolocation information, image data, the insurer database, a third-party database, and/or other data.

In one embodiment, a processing element (and/or heuristic engine or algorithm discussed herein) may be trained by providing it with a large sample of images and/or user data with known characteristics or features. Based upon these analyses, the processing element may learn how to identify characteristics and patterns that may then be applied to analyzing user device details, user request or login details, user device sensors, geolocation information, image data, the insurer database, a third-party database, and/or other data. For example, the processing element may learn, with the user's permission or affirmative consent, to identify the user and/or the asset that is to be the subject of a transaction, such as generating an insurance quote or claim, opening a financial account, handling a loan or credit application, processing a financial (such as a credit card) transaction or the like.

Additional Considerations

All of the foregoing computer systems may include additional, less, or alternate functionality, including that discussed herein. All of the computer-implemented methods may include additional, less, or alternate actions, including those discussed herein, and may be implemented via one or more local or remote processors and/or transceivers, and/or via computer-executable instructions stored on computer-readable media or medium.

The processors, transceivers, mobile devices, service terminals, servers, remote servers, database servers, heuristic servers, transaction servers, and/or other computing devices discussed herein may communicate with each via wireless communication networks or electronic communication networks. For instance, the communication between computing devices may be wireless communication or data transmission over one or more radio links, or wireless or digital communication channels.

Customers may opt into a program that allows them share mobile device and/or customer, with their permission or affirmative consent, with a service provider remote server. In return, the service provider remote server may provide the functionality discussed herein, including security, fraud, or other monitoring, and generate recommendations to the customer and/or generate alerts for the customers in response to abnormal activity being detected.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to improvements to computer functionality, and improve the functioning of conventional computers.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method, executed with a computer processor, that generates cross-selling recommendations using an aggregated customer transaction list, comprising:
retrieving, with the computer processor, an aggregated transaction list from a plurality of customers, stored in a first memory;
receiving, with the computer processor, a natural language input in a customer service environment from a human machine interface;
accessing, with the computer processor, a heuristic algorithm stored in a second memory;
executing the heuristic algorithm, with the computer processor, to generate at least one product recommendation using the natural language input and the aggregated transaction list, wherein a product category of the at least one product recommendation correlates with a predicted need;
receiving, with the computer processor, an indication of interest in the at least one product recommendation with the human machine interface; and
updating, with the computer processor, the heuristic algorithm in the second memory using a calculated correlation between the at least one product recommendation and the indication of interest.

2. The computer-implemented method of claim 1, wherein the natural language input comprises data related to a product support issue.

3. The computer-implemented method of claim 1, wherein the natural language input comprises data related to a new product purchase.

4. The computer-implemented method of claim 1, wherein the indication of interest includes the predicted need.

5. The computer-implemented method of claim 1, wherein the first memory comprises an external transaction server.

6. The computer-implemented method of claim 1, wherein the second memory comprises an external heuristic server.

7. The computer-implemented method of claim 1, wherein the natural language input in the customer service environment comprises spoken words received from the human machine interface.

8. A computer system configured to generate cross-selling recommendations using an aggregated customer transaction list, the computer system comprising one or more processors and/or transceivers:
retrieve an aggregated transaction list from a plurality of customers, stored in a first memory;
receive a natural language input in a customer service environment from a human machine interface;
access a heuristic algorithm stored in a second memory;
execute the heuristic algorithm to generate at least one product recommendation using the natural language input and the aggregated transaction list, wherein a product category of the at least one recommendation correlates with a predicted need;
receive an indication of interest in the at least one product recommendation with the human machine interface; and
update the heuristic algorithm in the second memory using a calculated correlation between the at least one product recommendation and the indication of interest.

9. The computer system of claim 8, wherein the natural language input comprises data related to a product support issue.

10. The computer system of claim 8, wherein the natural language input comprises data related to a new product purchase.

11. The computer system of claim 8, wherein the indication of interest includes the predicted need.

12. The computer system of claim 8, wherein the first memory comprises an external transaction server.

13. The computer system of claim 8, wherein the second memory comprises an external heuristic server.

14. A non-transitory computer readable medium, comprising computer readable instructions that when executed by a computer processor cause the computer processor to:
retrieve an aggregated transaction list from a plurality of customers, stored in a first memory;
receive a natural language input in a customer service environment from a human machine interface;
access a heuristic algorithm stored in a second memory;
execute the heuristic algorithm to generate at least one product recommendation using the natural language input and the aggregated transaction list, wherein a product category of the at least one product recommendation correlates with a predicted need;
receive an indication of interest in the at least one product recommendation with the human machine interface; and
update the heuristic algorithm in the second memory using a calculated correlation between the at least one product recommendation and the indication of interest.

15. The non-transitory computer readable medium of claim 14, wherein the natural language input comprises data related to a product support issue.

16. The non-transitory computer readable medium of claim 14, wherein the natural language input comprises data related to a new product purchase.

17. The non-transitory computer readable medium of claim 14, wherein the indication of interest includes the predicted need.

18. The non-transitory computer readable medium of claim 14, wherein the first memory comprises an external transaction server.

19. The non-transitory computer readable medium of claim 14, wherein the second memory comprises an external heuristic server.

20. The non-transitory computer readable medium of claim 14, wherein the natural language input in the customer service environment comprises spoken words received from the human machine interface.

* * * * *

UNITED STATES PATENT AND TRADEMARK OFFICE
CERTIFICATE OF CORRECTION

| | | |
|---|---|---|
| PATENT NO. | : 10,699,319 B1 | Page 1 of 1 |
| APPLICATION NO. | : 15/495693 | |
| DATED | : June 30, 2020 | |
| INVENTOR(S) | : Elizabeth A. Flowers et al. | |

It is certified that error appears in the above-identified patent and that said Letters Patent is hereby corrected as shown below:

In the Specification

Column 8, Line 43, change "1-26 and 28. The exemplary computing system 1100 and" to -- 1-10 and 12. The exemplary computing system 1100 and --.

Signed and Sealed this
First Day of November, 2022

Katherine Kelly Vidal
*Director of the United States Patent and Trademark Office*